United States Patent [19]
Preis et al.

[11] Patent Number: 5,499,336
[45] Date of Patent: Mar. 12, 1996

[54] MONITORING A COMPUTER NETWORK

[75] Inventors: Karl-Heinrich Preis, Bühlertal; Harald Bühren, Bühl; Bernd Klumpp, Lauf, all of Germany

[73] Assignee: Robert Bosch GmbH, Stuttgart, Germany

[21] Appl. No.: 249,075

[22] Filed: May 25, 1994

Related U.S. Application Data

[63] Continuation of Ser. No. 743,368, filed as PCT/DE89/00090, Feb. 17, 1989, abandoned.

[51] Int. Cl.[6] .................................................. G06F 11/34
[52] U.S. Cl. ...................... 395/182.02; 371/65; 371/20.1
[58] Field of Search ................................. 371/16.2, 16.3, 371/14, 29.5, 7, 8.1, 8.2, 65; 395/575, 181, 182.01, 182.02; 370/85.1, 85.9, 13; 379/1

[56] References Cited

U.S. PATENT DOCUMENTS

| | | | |
|---|---|---|---|
| 4,210,780 | 7/1980 | Hopkins et al. | 370/80 |
| 4,635,255 | 1/1987 | Clark et al. | 370/110.1 |
| 4,701,845 | 10/1987 | Andreasen et al. | 371/18 |
| 4,959,849 | 9/1990 | Bhusri | 371/20.1 |
| 5,111,460 | 5/1992 | Botzenhardt et al. | 370/13 |
| 5,155,846 | 10/1992 | Mino | 371/16.3 |
| 5,179,341 | 1/1993 | Whiteside | 370/13 |
| 5,182,745 | 1/1993 | Heichler | 370/85.1 |
| 5,200,949 | 4/1993 | Kobayashi | 370/13 |
| 5,343,477 | 8/1994 | Yamada | 371/8.2 |
| 5,398,240 | 3/1995 | Nakashima et al. | 370/85.1 |

*Primary Examiner*—Robert W. Beausoliel, Jr.
*Assistant Examiner*—Albert Decady
*Attorney, Agent, or Firm*—Frishauf, Holtz, Goodman, Langer & Chick

[57] ABSTRACT

A method is proposed for monitoring a computer network having at least two subscribers connected via a databus comprising at least two lines, said subscribers having in each case one receiving component and/or one transmitting component. The method is characterized by the fact that the functioning of the databus and/or the functioning of the subscriber is monitored with the aid of error detection signals (watch-dog signals, CEI) of at least one subscriber, and emergency operation measures (M1; M2), matched to the respective error case, for setting defined emergency modes of operation (single-wire mode, special emergency mode) are taken. After taking the first emergency operation measure (M1), it is tested whether the computer network is functioning free of errors. If this is the case, the first emergency operation measure is maintained and thus also the emergency mode of operation (single-wire emergency mode) adopted. If further errors should arise in the computer network after the first emergency operation measure has been taken, the first emergency operation measure is cancelled and the second emergency operation measure (M2) is taken. If, from now on, no further errors arise, the emergency operation mode, the special emergency mode, set by this measure is maintained. Only if further errors continue to arise are the affected subscribers or the entire computer network switched off (bus-off).

25 Claims, 10 Drawing Sheets

MONITORING A COMPUTER NETWORK

This application is a Continuation of application Ser. No. 07/743,368, filed as PCT/DE89/0090, Feb. 17, 1991, now abandoned.

FIELD OF THE INVENTION

The invention relates to a method for monitoring a computer network having at least two subscribers connected via a databus comprising at least two lines.

BACKGROUND OF THE INVENTION

Computer networks are being used increasingly frequently, in particular also in the automotive industry. So-called Controller Area Network interfaces (CAN-IC) which are constructed as integrated circuits are known. The connection of the individual network subscribers occurs via a databus which has, for example, two signalling lines. The information of the subscribers is transmitted via these lines. Any failure of one of the two signalling lines due to short circuit to earth or to the voltage supply or a break of the lines results in the entire network collapsing. This is then also the case if a short circuit occurs between the two bus lines or if one of the subscribers is defective.

The individual subscribers of a network have, in addition to the CAN-IC, a so-called bus interface. This is a special wiring of the CAN-ICs, by means of which it is intended to detect errors occurring on the bus lines.

However, systems of this kind do not permit a central monitoring of the functioning of the databus or of the functioning of individual subscribers of a computer network.

SUMMARY OF THE INVENTION

In contrast, the method according to the invention for monitoring a computer network has the advantage that bus-side hardware faults and functional failures of individual subscribers of a computer network are quickly detected and suitable emergency operation measures can be taken. It is particularly advantageous that the method can be used irrespective of the number of CAN-ICs participating in the bus traffic. A matching of the emergency operation measures to different numbers of subscribers is not necessary. It is particularly important that no additional components have to be provided for the individual subscribers for the execution of the method. Moreover, the databus is only loaded to an extremely small degree by the method according to the invention, i.e. there is low bus transmission overhead.

The functioning of the databus and/or subscribers occurs by means of error detection signals of at least one subscriber. In this process, external error detection signals, the so-called watch-dog signals, and internal error detection signals, the CAN error-interrupt signals (CEI signals) are differentiated. The external error detection signals are put onto the databus by one subscriber. The subscribers participating in the bus traffic expect this signal within a prescribed time pattern. Subscriber-internal errors are detected with the aid of a suitable error detection device and indicated by the CEI signal.

The method according to the invention is characterized by the fact that suitable emergency operation measures are taken as a function of the error detection signals, as a result of which an emergency mode of the computer network is set. The emergency operation measures are varied as a function of the errors occurring. If further errors arise after setting a first emergency operation, subsequent emergency operation measures are taken, in order to set a further emergency mode of operation. Only if further errors occur after this are the subscribers affected by the errors, and if necessary the entire network, switched off, a so-called bus-off occurs.

Particularly preferred is a method in which the bus-off mode is disabled again, if only a single subscriber is defective and, as a result, has been switched off. This method has the advantage that all the other subscribers can then resume the normal two-wire operation.

Finally, a method is preferred in which the error monitoring can be switched off if the entire network has switched over into the bus-off mode. By means of this measure, an emergency operation of the network is possible, even if a further error monitoring is then no longer possible.

In particular, it is indicated how emergency operation measures can be taken in response to different errors occurring in the computer network.

BRIEF FIGURE DESCRIPTION

The invention will be described in greater detail below with reference to the figures. In individual diagrams, the signals transmitted by the subscribers of the computer network and the emergency operation measures taken as a result of errors are explained. For example, it is assumed that the computer network has two further subscribers A and B in addition to a subscriber (master) which transmits an external error detection signal (watch-dog signal). However, the method is in no way limited to a network with three subscribers.

DETAILED DESCRIPTION

The error monitoring method will be described with reference to a computer network and multiplexing system, which is equipped with a two-wire bus. The data are transmitted via the two bus lines. In the event of errors, it is possible to continue to transmit the information in single-wire emergency mode.

There are recessive and dominant levels on the lines of the databus. A dominant level can be written over in place of a recessive level. In the steady-state mode, in the idling mode, the bus is in the recessive state, that means that the first data line U+ is at a first predetermined level of, for example, 3.5 V and the second line U− of the databus is at a second predetermined level of, for example, 1.5 V. A dominant level is present if the first data line assumes the potential of the second line, and the second data line assumes the potential of the first line.

For the following description, a classification of the errors will be carried out:

An error is designated as steady-state if it can be detected independently of the bus state, that is to say regardless of whether the bus is in the idling mode or whether data are being transmitted.

An error is designated as dynamic if it can only be detected during a data-transmission.

According to the criterion of error detection, the errors can be differentiated as follows:

In the case of a steady-state, global error, a continuously dominant level arises on the bus lines. This error is detected immediately after its occurrence by each CAN module of a subscriber.

In the case of a dynamic, global error, there is a continuous recessive level on the bus lines. This error cannot be detected in the idling mode of the bus but rather only during a data transmission for all subscribers.

In the case of a steady-state, local error, a defective subscriber continuously-reads in a dominant level. This error is detected immediately after its occurrence by the subscriber affected.

In the case of a dynamic, local error, a defective node cannot read itself in correctly. The subscribers which are equipped with a transmitting component and a receiving part read in their own information which is transmitted onto the databus from their transmitting part, for the purpose of monitoring, this means that, via the receiving component, a subscriber reads in its own information transmitted by the transmitting component and monitors it. A dynamic, local error is therefore first detected by the defective subscriber during a data transmission of said subscriber.

Figure 1:
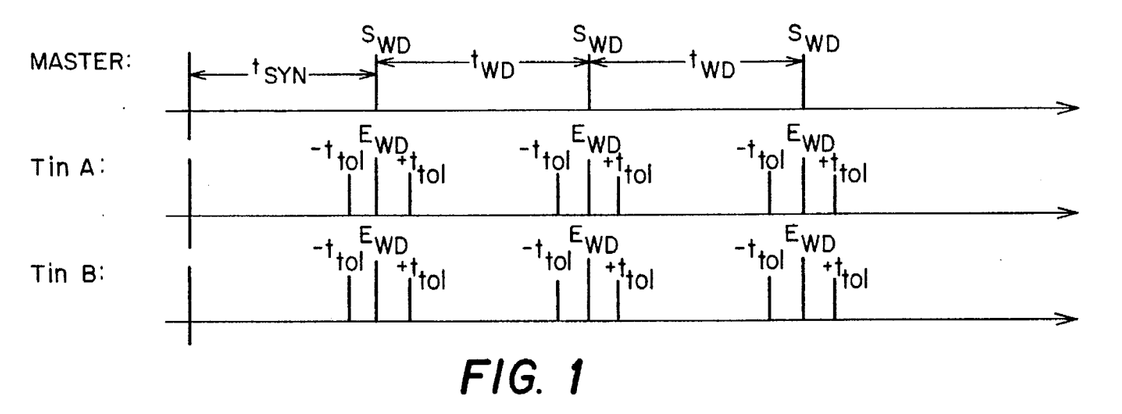
FIG. 1 shows the signals occurring in normal operation.

The normal operation of the computer network is explained with reference to FIG. 1.

A subscriber which, for example, also assumes the bus supply and the monitoring of the level on the data lines, transmits cyclically a first external error detection signal, a watch-dog message. The transmitted signal is designated as $S_{WD}$. A signal of this kind is issued by the master after a synchronization period $t_{SYN}$, which serves to enable the individual subscribers, here Tln A and Tln B, to carry out a timing synchronization.

Normally, the watch-dog signal $S_{WD}$ is received by the subscribers. The received signal is designated as $E_{WD}$.

In error-free operation, the watch-dog signal of the master arrives at the subscribers within a time window which is designated as $-t_{tol}$ and $+t_{tol}$. The watch-dog signal $S_{WD}$ is repeated after a time of $t_{WD}$.

Signals which have been received or transmitted free of errors are designated by a continuous vertical line.

The monitoring concept for a steady-state, global error is now described with reference to FIGS. 2 to 4, in the case of said error a dominant level being present on the bus lines, and said error affecting all the subscribers of the computer network.

Figure 2:
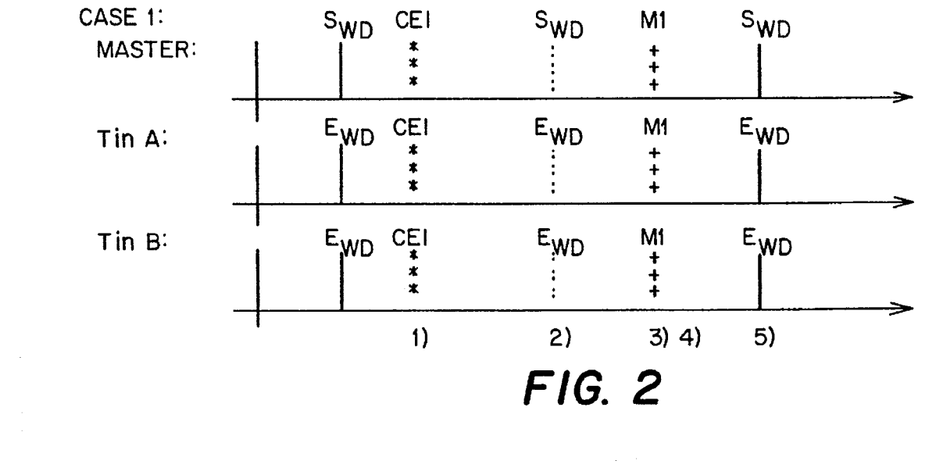
FIGS. 2 to 4 show the variation with time of the signals during the reaction to a steady-state, global error.

From FIG. 2, it is clear that the watch-dog signal $S_{WD}$ first transmitted by the master has been received by the subscribers A and B. After this, the steady-state, global error occurred. As a result, an error detection device is activated at each subscriber. Said detection device consists, for example in an error counter which is incremented at every error, until, finally, an internal error detection signal, the CAN error-interrupt signal (CEI) is transmitted. After each CEI, the error counters are reset, in that the CAN module of the subscriber is reset and then restarted again.

The internal error detection signal CEI is transmitted, in FIG. 2 at the time 1) by all the subscribers of the computer network. After the occurrence of the CEI signal which is characterized by stars lying vertically on top of one another, the next watch-dog signal $S_{WD}$ is waited for. Colons lying vertically on top of one another show that the signal expected in the predetermined time pattern cannot be transmitted or received. In the present case, no information can be transmitted via the databus by means of the continuously dominant level. The watch-dog signal $S_{WD}$ can therefore not be transmitted by the master and thus not received by the subscribers A and B ($E_{WD}$). Due to this fact, a first emergency operation measure M1 is initiated.

The initiation of the emergency operation measure is indicated by plus signs lying vertically on top of one another. At the time 3) the emergency operation measure M1 is initiated. At the time 4) it is tested whether further CEI signals occur. This is not the case in FIG. 2. It can be seen that at the time 5) the watch-dog signal $S_{WD}$ can be transmitted by the master and received by the subscribers A and B. The first emergency mode of operation, the single-wire emergency mode, is maintained from now on.

Figure 3:
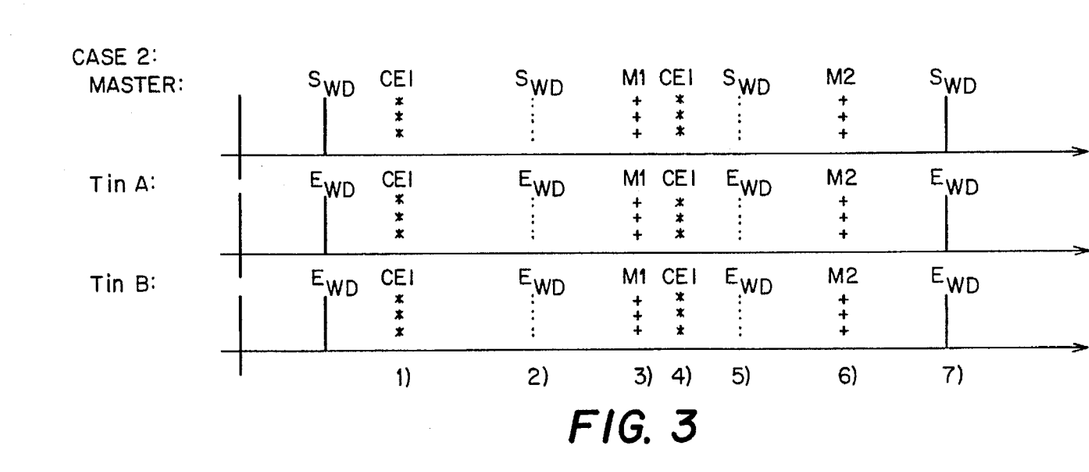

In FIG. 3, a timing diagram is illustrated in which the emergency operation measure M1 initiated at the time 3) has not led to error clearance. The events at the times 1), 2) and 3) correspond to those explained with reference to FIG. 2. It is not necessary to describe them again here.

In FIG. 3, that is to say at the time 3), the first emergency operation measure M1 is initiated. Despite this measure, at the time 4) an internal error detection signal CEI occurs again at all subscribers. This means therefore the error was not eliminated by the emergency measure. As a result, at the time 6) the emergency operation measure M2 is initiated. The emergency operation measure M1 is cancelled.

At the time 7) it is tested whether further error signals CEI arise. This is not the case in FIG. 3, the handling of the error situation, the so-called error handling, is terminated. At the time 8) the watch-dog signal $S_{WD}$ transmitted by the master is received again ($E_{WD}$) by the subscribers A and B. The second emergency mode of operation, the special emergency mode, is maintained from now on.

Figure 4:
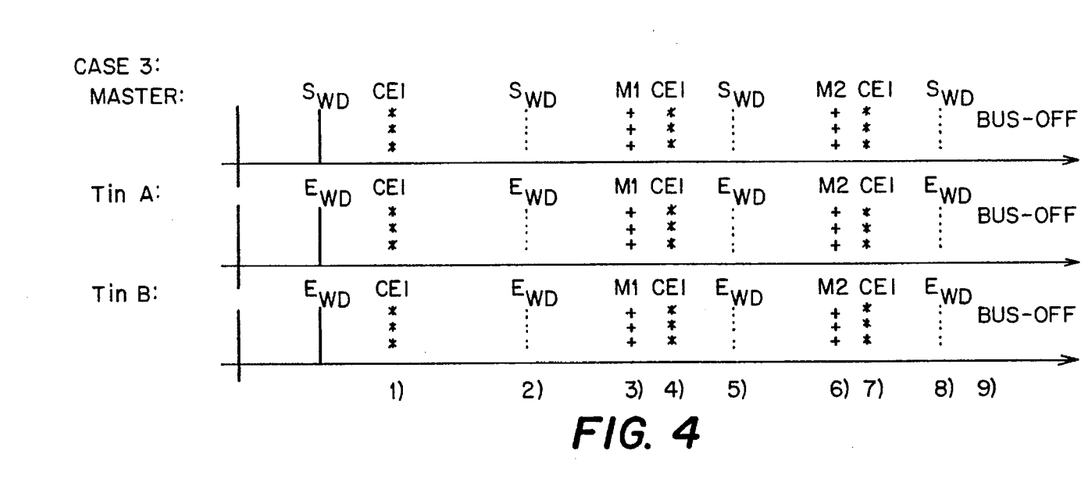

In FIG. 4), in turn, a timing diagram is shown which illustrates the variation with time of the signals during the handling of a steady-state, global error. However, in contrast with the error in FIG. 3, the emergency operation measure M2 has not led to the clearing of the error. The signals at the times 1) to 6) correspond to those in FIG. 3, so that it is not necessary to describe them again.

At the time 6) the second emergency operation measure M2 is therefore initiated, because, after initiation of the first emergency operation measure M1, an error signal CEI has occurred again at the time 4), so that the watch-dog signal could not be transmitted and received at the time 5).

After initiation of the second emergency operation measure M2, an error signal CEI occurred again at all subscribers, so that the watch-dog signal $S_{WD}$ could not be transmitted by the master and could not be received ($E_{WD}$) by the subscribers A and B.

The watch-dog signal would have to have been transmitted and received at the time 8).

As a result, at the time 9) all the subscribers of the computer network-are switched off, and the so-called bus-off is therefore initiated.

Even in the switched-off state the subscribers of the network are not completely free from current. They can still react to signals, and they can still assume emergency functions in this emergency operation phase.

Figure 16:
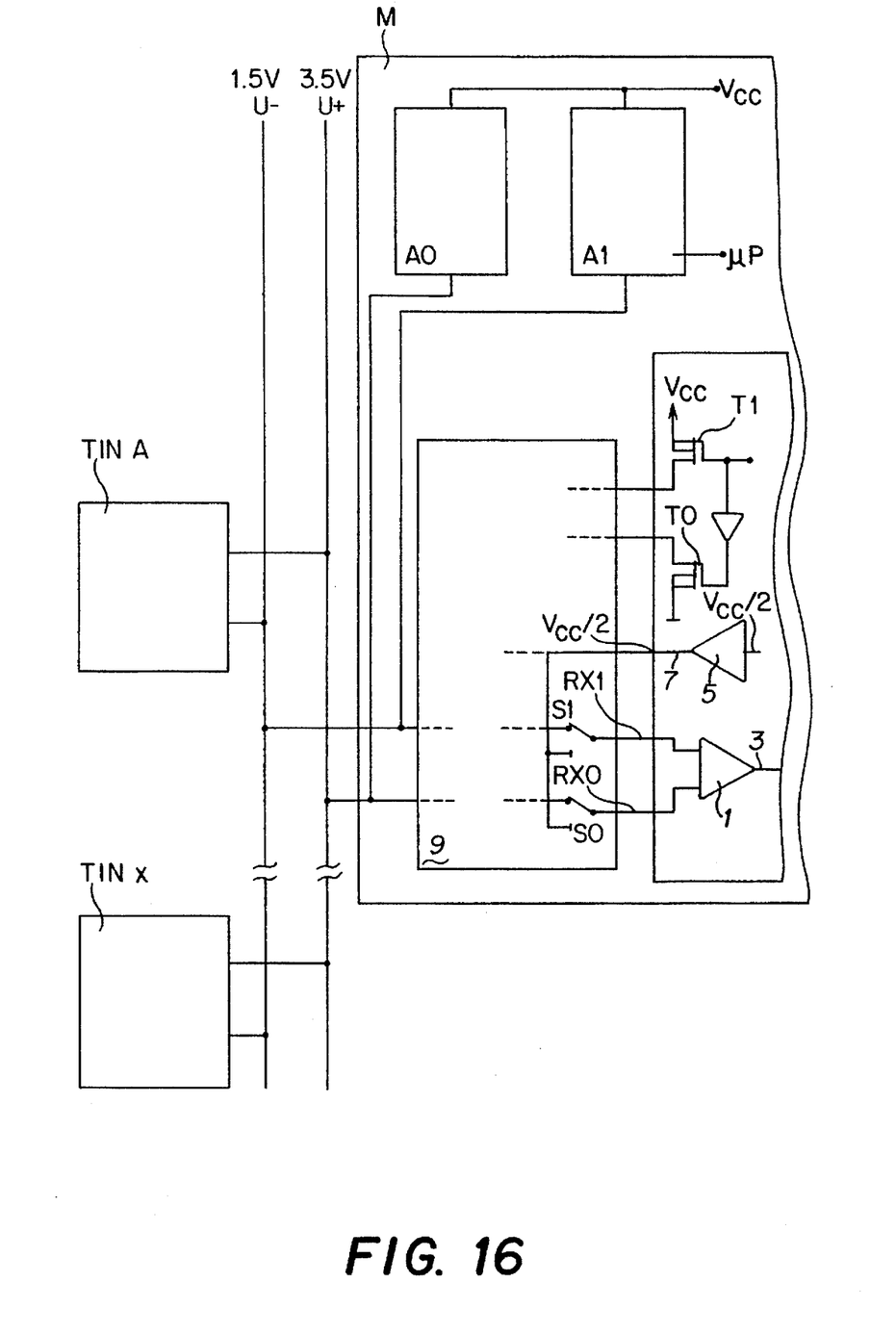
FIG. 16 shows a block circuit diagram of a computer network in which the method can be used.

The following steps are taken to initiate the first emergency operation measure M1 mentioned in FIGS. 2 to 4:

The input RX0 of all the CAN-ICs assigned to the first line U+ of the databus is placed at a predetermined potential of, for example, $V_{cc}/2$. This can be achieved, for example, by means of a changeover switch S0, as shown in FIG. 16. Then, the CAN module of all the subscribers can be started again. By means of this emergency operation measure, a first emergency operation mode, a so-called single-wire emergency mode can be set.

The second emergency operation measure M2 mentioned in the FIGS. 3 and 4 consists, on the one hand, in reversing the first emergency operation measure M1. This means, therefore, all the inputs RX0 are again connected to the first line U+ of the databus and disconnected from the predetermined potential $V_{cc}/2$. For this, all the inputs RX1 which are assigned to the second data line U− of the databus are placed at the predetermined potential, in that the switch S1, constructed as a changeover switch, is activated.

Moreover, the output terminal TX1, assigned to the second data line U−, of each subscriber is switched in such a way that information of the subscribers can no longer be transmitted onto the data line.

Additionally, the second data line U− is switched off exclusively at the master. This occurs by means of a special control signal, for example, of a microprocessor µP to the terminating network A1, which is provided at the master.

By means of the second emergency operation measure M2, the second emergency operation mode is switched on, the so-called special emergency mode. This is also a single-wire emergency mode.

Figure 5:
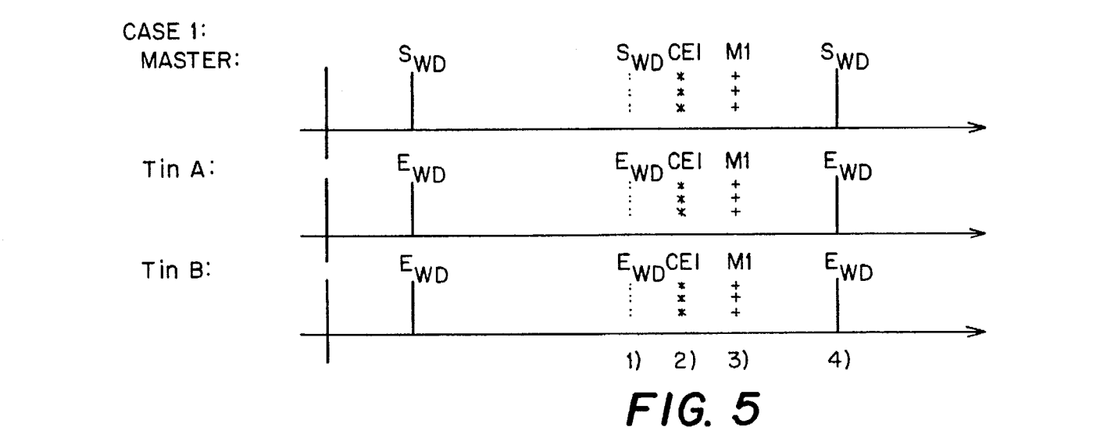
FIGS. 5 to 7 show the variation with time of the signal during the reaction to a dynamic, global error.
Figure 6:
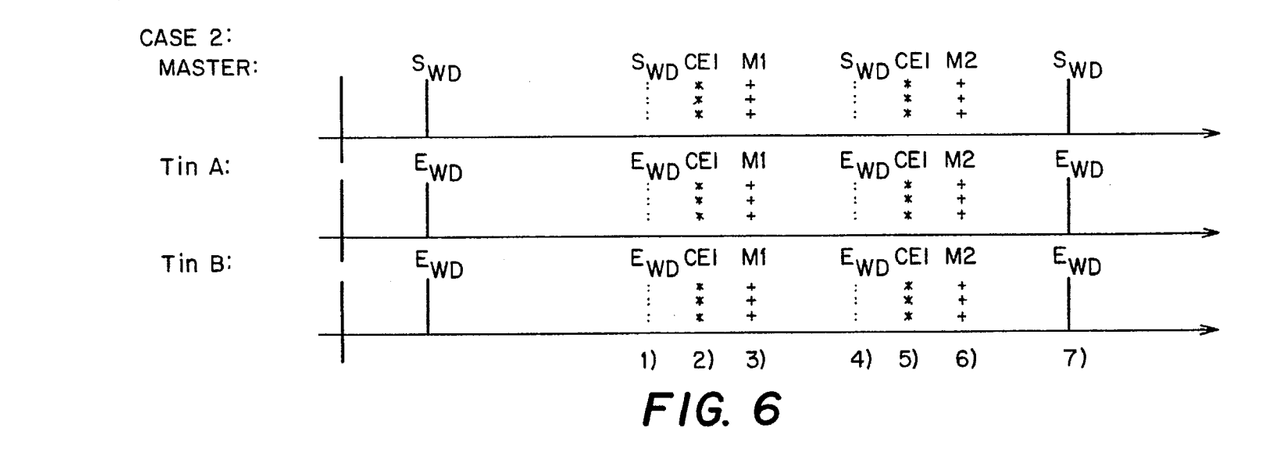
Figure 7:
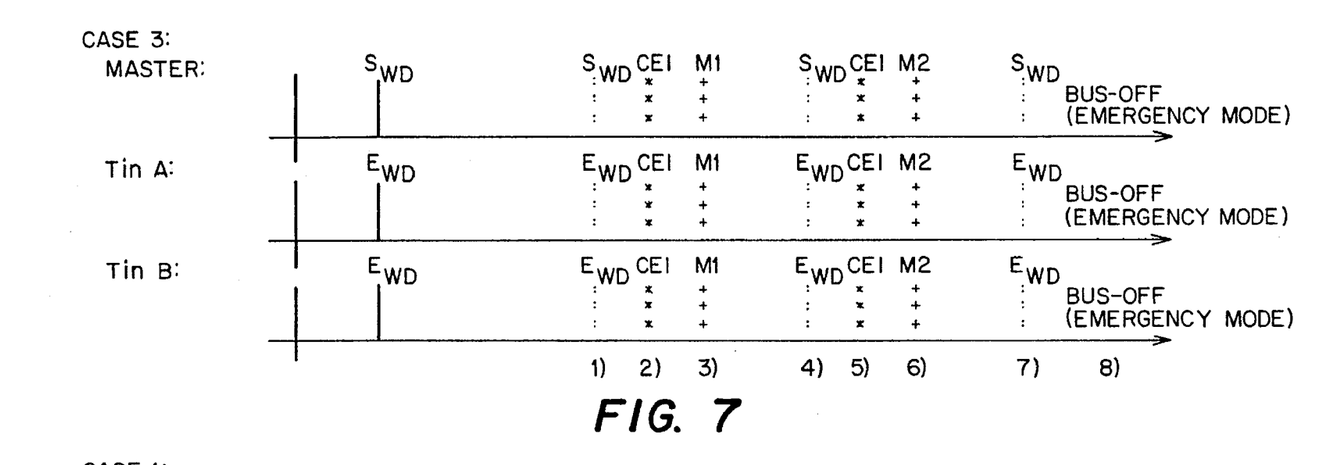

In the timing diagrams of FIGS. 5, 6 and 7, the variation with time of the error handling is illustrated for a dynamic, global error. When transmitting the watch-dog signal $S_{WD}$ of the master, each node detects an error.

It can be seen from FIG. 5 that the watch-dog signal $S_{WD}$ transmitted by the master was first received by the subscribers A and B. The watch-dog signal $S_{WD}$ to be transmitted by the master at the time 1) was not transmitted, and the time frame predetermined by $t_{tol}$ when transmitting the watch-dog signal was exceeded. In addition, the master has been supplied with a CAN error-interrupt signal CEI at the time 2), because it was not possible to transmit the watch-dog signal in an error-free condition.

The watch-dog signal of the master has also not been received at the receivers A and B, since the signal $E_{WD}$ was absent. Or, the module-internal error detection signal CEI was received at the two subscribers at the time 2), because the watch-dog signal was received in an errored condition.

The emergency operation measure M1 was then initiated at the time 3), as during the error handling for a steady-state, global error. In FIG. 5, this led to the watch,dog signal $S_{WD}$ being transmitted by the master and being received ($E_{WD}$) by the subscribers A and B. This was the case at the time 4). The computer network now operates free of errors in the first emergency mode of operation, the single-wire emergency mode.

The diagram illustrated in FIG. 6 differs from that in FIG. 5 in that at the time 4) it was not possible to transmit and receive the watch-dog signal, in that the emergency operation measure M1 which was initiated at the time 3) did not lead to error elimination. At the time 4) the watch-dog signal was neither transmitted nor received, and at the time 5) all the subscribers received the internal error detection signal CEI.

Then, at the time 6) the second emergency operation measure M2 was initiated at all the subscribers. The steps necessary for this-were described above.

Due to the emergency operation measure M2, no further error occurred in the case illustrated in FIG. 6. At the time 7), the watch-dog signal could be transmitted and received by the subscribers. The error handling is thus terminated. The special emergency mode established by means of the emergency operation measure M2 is maintained.

In the timing diagram according to FIG. 7, the signals explained with reference to FIGS. 5 and 6 are entered at the times 1) to 6). However, the second emergency operation measure M2 is not successful here: at the time 7) the watch-dog signal $S_{WD}$ cannot be transmitted by the master and cannot be received ($E_{WD}$) by the subscribers A and B.

Then, the subscribers disconnect themselves from the bus, the so-called bus-off is initiated. This procedure occurs at the time 8).

A special emergency operation of the subscribers also occurs here, so that emergency functions are also maintained.

The reaction to a steady-state, local receive-side error of a subscriber, here of the subscriber Tln A, is explained with reference to the timing diagrams in FIGS. 8 to 10.

As soon as the error occurs, an error detection device at the defective subscriber is activated. This has, for example, an error counter which is incremented on the occurrence of each error until, finally, a CAN error-interrupt signal (CEI) is transmitted. In FIG. 8, the CEI signal at the subscriber A occurs at the time 1).

After each CEI, the error counter of the subscriber is reset, in that the CAN module is reset and then started up again.

At the time 2), the watch-dog signal $S_{WD}$ transmitted by the master should have arrived at the subscriber A. This was not the case, which is indicated by the colons lying on top of one another and designated as $E_{WD}$. In FIG. 8, the continuous line indicates that the watch-dog signal at the subscriber B arrives at the time 2).

Due to the absence of the watch-dog signal $S_{WD}$, at the subscriber A—as in the case of the steady-state, global error—emergency operation measure M1 is initiated, namely at the time 3). In FIG. 8, at the time 4) no further CEI signals occur, which means that the first emergency operation mode, the single-wire emergency mode, of the defective subscriber A is maintained. The network now operates free of errors again.

Figure 9:
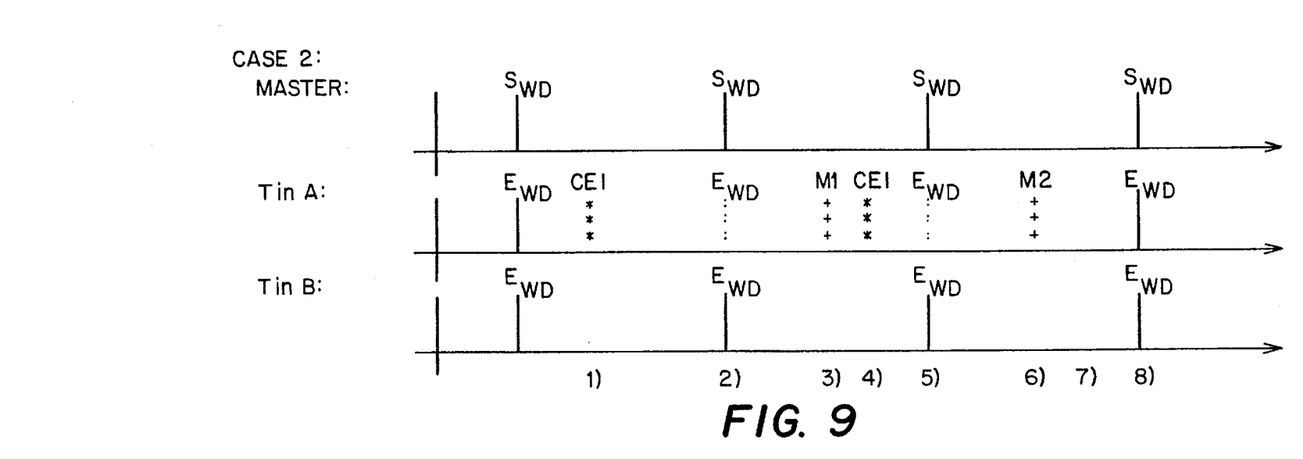

In the timing diagram in FIG. 9 it is assumed that the error of the first subscriber is not cleared even after initiation of the first emergency operation measure M1 at the time 3). Therefore, at the time 4) an internal error detection signal CEI of the subscriber A occurs. It is also not able to receive the external error detection signal of the master, the watch-dog signal $S_{WD}$, at the time 5). In contrast, the signal arrives free of errors at the subscriber B.

As a result, the subscriber A initiates the second emergency operation measure M2 at the time 6).

At the time 7) it becomes apparent that no further error detection signals CEI are occurring at the subscriber A. It is therefore operating free of errors and can receive $E_{WD}$ the watch-dog signal $S_{WD}$ of the master at the time 8). The second emergency mode of operation, the special emergency mode, of the subscriber A is maintained from now on.

Figure 8:
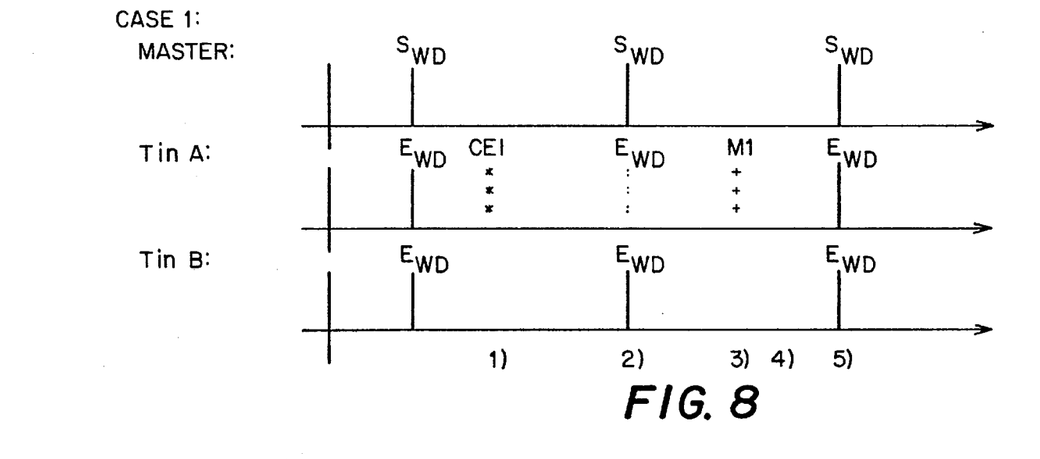
FIGS. 8 to 10 show the signals during the reaction to a steady-state, local error on the receive-side.
Figure 10:
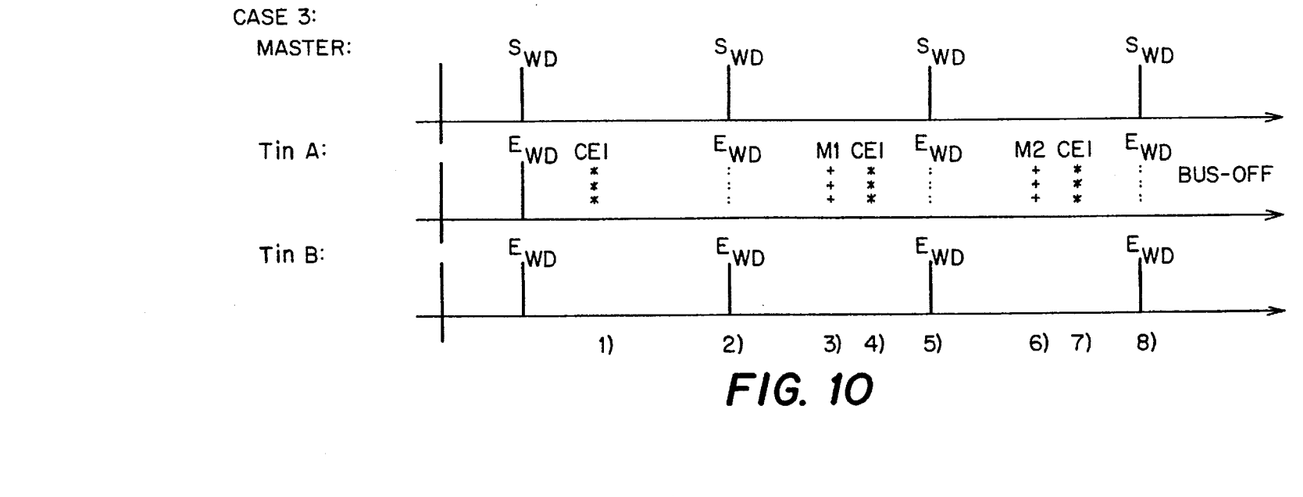

In FIG. 10, a timing diagram is represented in which the same signals as in the FIGS. 8 and 9 are entered at the times 1) to 6). However, at the time 7) even after initiation of the emergency operation measure M2, the error of the subscriber A is still not eliminated at the time 7). Rather, a further internal error detection signal CEI arises there. It cannot receive the watch-dog signal $S_{WD}$ of the master at the time 8) either. Therefore, it is disconnected from the network at the time 9) and goes into the bus-off state. Here, too, an emergency mode with emergency functions of the subscriber A is maintained.

By means of the emergency operation measure M1 described in FIGS. 8 to 10, the defective subscriber A is placed in the first emergency operating state, the so-called single-wire emergency mode. By means of the emergency operation measure M2, the defective subscriber A is placed in the second emergency operation mode, the so-called special emergency mode.

In the case of a dynamic, local receive-side error of a subscriber, the error handling is identical to that in the case of the dynamic, global error which has been described with reference to FIGS. 5 to 7. This is due to the fact that the subscriber cannot detect whether merely a local or a global error has occurred.

The error reaction, the error handling, in the case of a local, transmit-side error is described with reference to the timing diagrams in FIGS. 11 to 12. In the case of a defect of this kind, a subscriber can receive the watch-dog signal of the master, so that no error handling is initiated. However, it is not able to confirm the reception of the signal of the master. For this, it would have to transmit an acknowledge-bit to the data network. With a plurality of subscribers, the master is not able to detect which subscriber is defective if it receives at least one acknowledge-bit, since each subscriber which receives the watch-dog signal transmits a bit of this kind.

The local transmit-side error is, however, detected if a subscriber expects a signal from another subscriber. If this signal does not arrive, this subscriber can detect that the subscriber which wanted to transmit has an error in the transmitting component.

Figure 11:
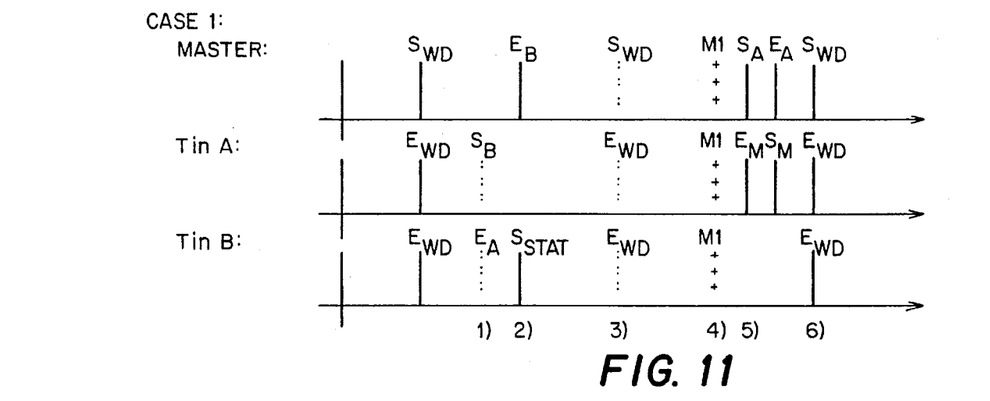
FIGS. 11 and 12 show the signals during the reaction to a local, dynamic error on the transmit-side.

In the timing diagram in FIG. 11, it is assumed that the subscriber A was to transmit a signal $S_B$ to the subscriber B. At the time 1), this signal does not arrive at the subscriber B, and said subscriber receives no message ($E_A$) from the subscriber A. The subscriber B then transmits at the time 2) a so-called status message to the master with the content "the subscriber A has not transmitted". In FIG. 11, the reception of this signal is indicated by $E_B$ at the time 2). Due to the status message of the subscriber B, the master detects the local, transmit-side defect at the subscriber A and brings about the initiation of the error handling, in that it allows the next watch-dog signal $S_{WD}$ to fail at the time 3). Then, the subscribers A and B cannot receive ($E_{WD}$) a signal of this kind.

Due to the failure of the watch-dog signal of the master, an error handling is initiated at all the subscribers. At the time 4), the first emergency operation measure M1 is then initiated, as is the case in the event of a global error.

After initiation of the emergency operation measure, at the time 5) the master asks the defective subscriber A to report to it. The defective subscriber has the facility to test itself in this way.

In FIG. 11, it is assumed that the subscriber A is now able, thanks to the single-wire emergency mode initiated by the measure M1, to report to the master. The request $S_A$ of the master arrives at the subscriber. This is indicated by $E_M$. Then, the subscriber A transmits the signal $S_M$. This signal also arrives at the master, which is indicated by $E_A$. The following cycle now occurs free of errors. The watch-dog signal $S_{WD}$ of the master arrives at the subscriber A at the time 6) ($E_{WD}$). Of course, the watch-dog signal of the master is received from the error-free subscriber B.

Figure 12:
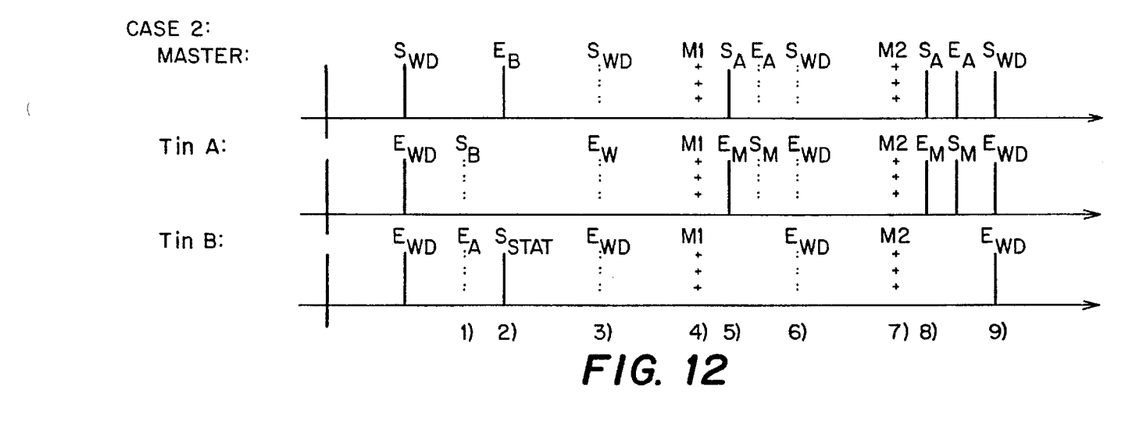

In FIG. 12, a timing diagram is shown which corresponds to that in FIG. 11 up to the time 4). This means therefore that in the error reaction in FIG. 12, the emergency operation measure M1 is initiated at the time 4 at all subscribers. Subsequently, the master requests the subscriber A to report to it. The signal $S_A$ of the master arrives at the subscriber A at the time 5), which is characterized by the continuous line which is designated as $E_M$.

The subscriber A is, however, not able, due to the transmit-side-defect, to transmit the signal. $S_A$ to the master. The latter then suppresses the transmission of the watch-dog signal $S_{WD}$ during the next cycle at the time 6), so that neither the subscriber A nor the subscriber B can receive a signal of this kind. At all the subscribers, the second emergency operation measure M2 is then initiated, and, to be precise, at the time 7). In FIG. 12, it is assumed that the request of the master to the subscriber A to report to the master has been correctly replied to by now. At the time 8), the signals $S_A$, $E_M$ are now exchanged free of errors.

Subsequently, at the time 9), an error-free operation can be maintained, namely the special emergency mode: the watch-dog signal $S_{WD}$ arrives free of errors at the subscribers A and B.

During the treatment of the local, transmit-side error, it is assumed that the emergency operation measures M1 and M2 which are described above with reference to the steady-state, global error are executed at all the subscribers. After the emergency operation measure M1, all the subscribers are in the first emergency operation mode, the single-wire emergency mode. If the second emergency operation measure M2 has to be initiated after a further error, all the subscribers are in the second emergency operation mode, the special emergency mode.

Figure 13:
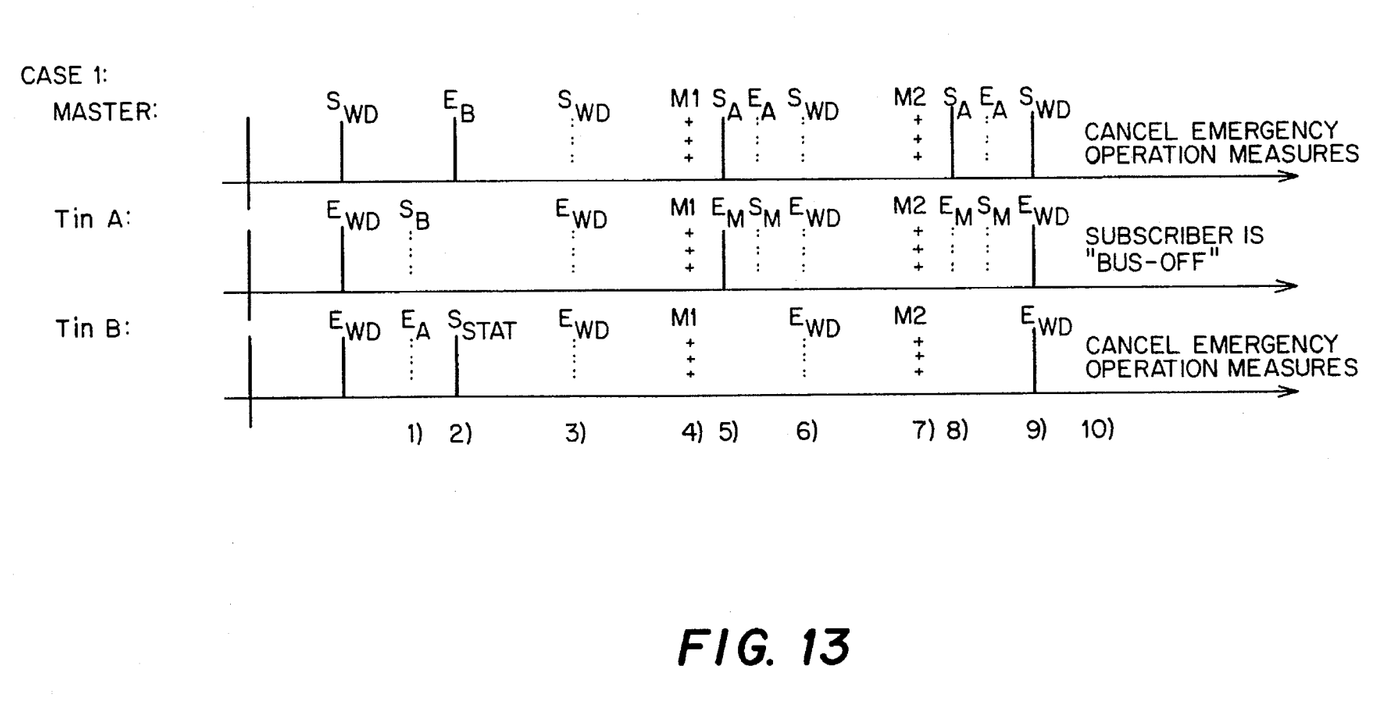
FIG. 13 shows the signals during the handling of a bus-off by a subscriber.

FIG. 13 shows the timing sequence of the signals during the error handling in the case of a bus-off state of a subscriber. This error cannot be detected until an expected message of a subscriber is absent. It is then tested whether the corresponding subscriber is defective on the transmit side or whether it is in the "bus-off" state. In the illustration in FIG. 13, a bus-off of the subscriber A is assumed.

The measures which are illustrated in FIG. 13 at the times 1) to 7) correspond to those which are taken in the event of a local, transmit-side defect. In this respect, the description of FIGS. 11 and 12 should be referred to.

Initially, the external error detection signal of the master, the watch-dog signal $S_{WD}$, can be received by the subscribers A and B. At the time 1), the subscriber B no longer receives an expected message of the subscriber A. Therefore, it transmits at the time 2) a status message "subscriber A has not transmitted" to the master. The latter then allows the watch-dog signal to fail at the time 3), as a result of which the first emergency operation measure M1 is initiated at all the subscribers at the time 4). At the time 5), the master requests the subscriber A, by means of the signal $S_A$, to report to it. The subscriber is not able to do this.

Then, at the time 6) the watch-dog signal of the master is suppressed again. Therefore, all the subscribers initiate the second emergency operation measure M2 at the time 7).

Again, at the time 8), the master requests the subscriber A to report to it. However, it is still not able to do this.

The master concludes from this that the subscriber A is not participating in the bus traffic and is in the bus-off state. Then, the emergency operation measure is cancelled both at the master and at all other subscribers. Only the subscriber A remains in the bus-off. The cancellation of the emergency operation measures occurs at the time 10).

Figure 14:
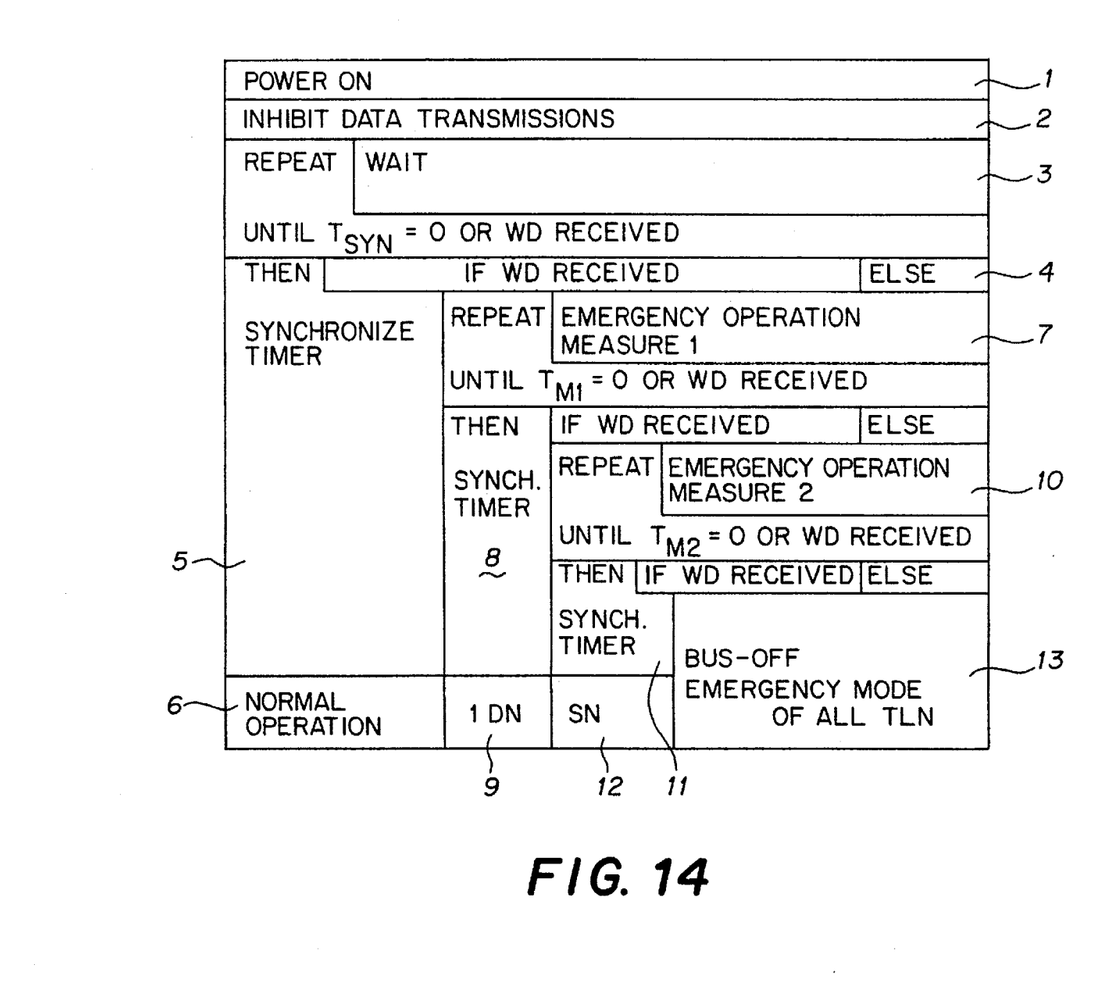
FIG. 14 shows a flowchart in which the measures taken in the event of an error occurring in the quiescent state can be seen.

The error monitoring method, the error handling, in the case of an error in the quiescent state is now explained with reference to the flow diagram in FIG. 14. If, namely already before the start-up of the computer network, an error is present, the individual subscribers must initiate emergency operation measures synchronously. For this, substantially longer synchronization times are necessary than indicated in FIG. 1. In order to ensure that all the subscribers carry out the same emergency operation measure at the same time, synchronization times of, for example $T_{M1}=1s$ and $T_{M2}=2s$ are required. The synchronization times during which the emergency operation measures M1 and M2 are maintained are designated as TM1 and TM2. In these periods, it is tested whether the watch-dog signal arrives.

In a first step 1, the voltage supply of the computer network is switched on. In the second step 2, all data transmissions of the subscribers are inhibited. In the third step 3, the system waits until the synchronization time $T_{SYN}$ illustrated in FIG. 1 has elapsed, or until a watch-dog signal has been received.

In step 4, it is interrogated whether the watch-dog signal has arrived. If this is the case, in step 5 a synchronization of the computer network is carried out and then in step 6 the normal operation of the computer network is resumed.

If no watch-dog signal has been received, in step 7 the emergency operation measure M1 is initiated. This is maintained until the synchronization time $T_{M1}$ has elapsed, or until a watch-dog signal has been received. If this is the case, in step 8 the timer synchronization is carried out and in step 9 the first emergency operation mode, the single-wire emergency mode 1 DN, is maintained.

If no watch-dog signal has been received, the emergency operation measure M2 is initiated in step 10. The latter is maintained until the time $T_{M2}$ has elapsed, or until a watch-dog signal has been received. If this is the case, in step 11 a timer-synchronization is carried out and then in step 12 the special emergency mode SN is maintained.

If no watch-dog signal is received, in step 13 the bus-off of all subscribers is initiated. The subscribers remain in a basic emergency mode of operation.

The emergency operation measure M1 and M2 are identical to those which have been described with reference to the steady-state, global error. Therefore, the explanation of the error handling of this error case should be referred to. It is also apparent that, with the method in FIG. 14, the first emergency operation mode, the single-wire emergency mode, is maintained by means of the emergency operation measure 1, and the second emergency operation mode, the special emergency mode, is maintained by means of the second emergency operation measure M2.

Figure 15:
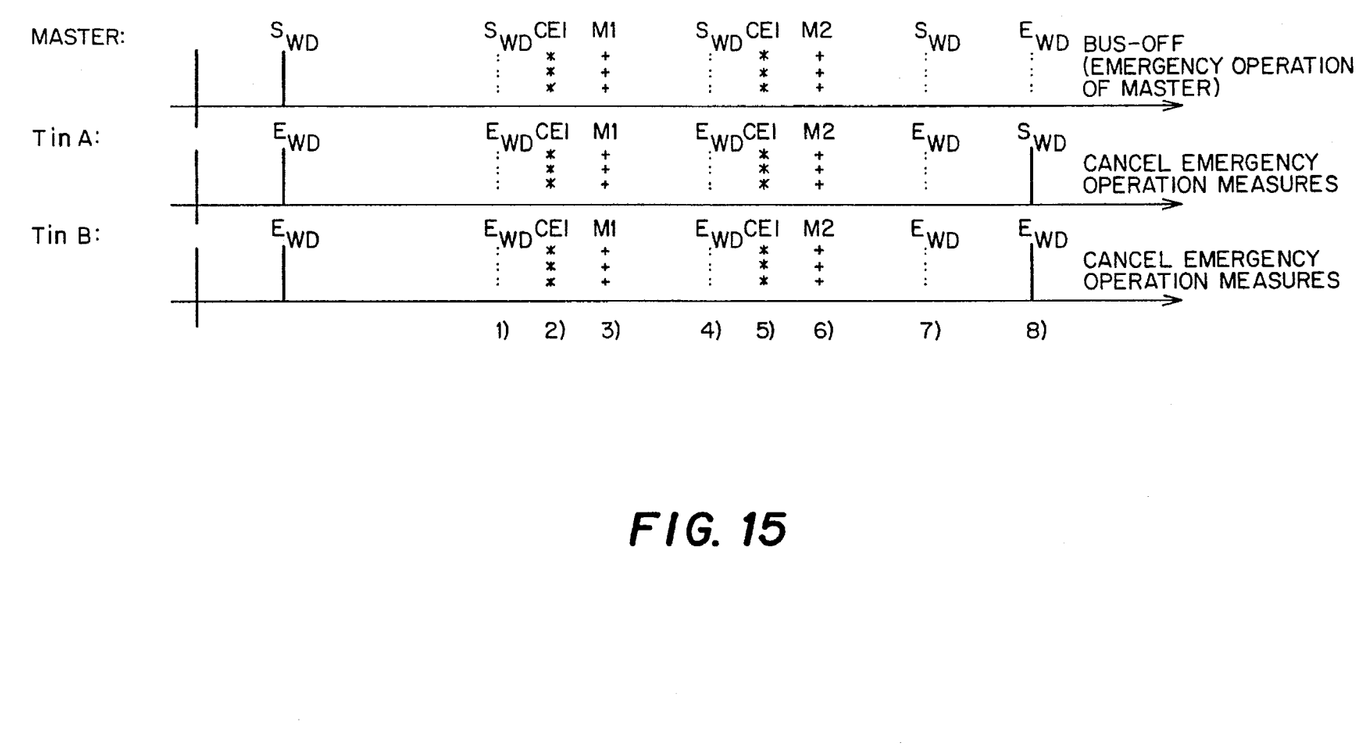
FIG. 15 shows the signals during the reaction to a defect of the master.

FIG. 15 shows a timing diagram in which the variation with time of the signals during the reaction to a defect of the master is illustrated.

The signals occurring at the times 1) to 7) correspond to those of the error handling during a dynamic, global defect.

From the diagram it can be seen that the error detection signal, the watch-dog signal $S_{WD}$, transmitted by the master was first received free of errors by the two subscribers A and B. At the time 1), the watch-dog signal was still neither transmitted nor received. Then, all the subscribers transmitted the internal error detection signal CEI at the time 2) and initiated the first emergency operation measure M1 at the time 3). It is apparent that this measure was not able to clear the error: at the time 4), the watch-dog signal was neither transmitted nor received. Then, all the subscribers transmitted the internal error signal CEI at the time 5) and initiated the second emergency operation measure M2 at the time 6). The second emergency operation mode, the special emergency mode, then induced was also unable to clear the error. At the time 7), the watch-dog signal was still neither transmitted nor received.

In order to avoid a total shutdown of the entire system, at the time 8) the master alone was disconnected from the network; a bus-off then takes place. Only an emergency operation function of the master is maintained.

Instead of the master, for example, the subscriber A now transmits the next watch-dog signal at the time 8), which is illustrated by a continuous line and the designation $S_{WD}$. This signal is also received free of errors by the subscriber B. Both subscribers now cancel the emergency operation measures initiated at the times 3) and 6) and continue to operate without error monitoring. It is also possible for more than one further subscriber to be equipped in such a way that it can assume the full master function, that is to say also the bus supply and the monitoring of the levels on the bus lines. However, for this in each case one terminating network would have to be provided at the corresponding subscribers, which without doubt would be very costly.

In order to clarify the comments above, in FIG. 16 a basic outline of a computer network is illustrated.

A databus connecting the subscribers has here, for example, two data lines U+ and U−. The information of the network is passed on via these lines.

One of the subscribers assumes the bus supply and the monitoring of the levels present on the data lines. It serves as master M. It is provided with a terminating network A0 and A1, which is connected, on the one hand to a supply voltage $V_{cc}$ and, on the other hand, to the data lines U− and U+ of the bus. The terminating network can have, for example, emitter followers. One element A1 of the terminating network is connected to a microprocessor µP which transmits control signals. The second data line U− is switched off by means of a suitable control signal, for example, on initiating the second emergency operation measure M2.

The master M has a CAN module, of which only the output terminals TX0 and TX1 of the transmitting component and the input terminals RX1 and RX0 of the receiving component are indicated here. Of the transmitting component of the CAN module, only the driver stages T1 and T0 are illustrated, one of which, T1, being connected to a supply voltage of, for example, +5 V and the other, T0, being connected to earth. The two driver stages are driven in a suitable manner. The input terminals RX0 and RX1 of the CAN module are connected to a receiving comparator 1, which evaluates the signals occurring on the input terminals and passes them on via an output line 3. The CAN module is, moreover, supplied with an operational amplifier 5, at whose input the voltage $V_{cc}/2$ is applied. Via its output 7, a terminal $V_{cc}/2$ is placed at this potential. It serves as reference potential. Between the data lines U+ and U− and the input terminals RX0 and RX1 as well as the output terminals TX0 and TX1, a bus interface 9 is provided which serves for setting special potentials.

Moreover, the bus interface 9 is provided with changeover contacts S0 and S1 which cooperate with the input terminals RX0 and RX1 of the CAN module. Via the first changeover contact S0, the input terminals RX0 of the CAN module can be connected to the prescribed potential. The second changeover contact S1 serves to apply the input terminal RX1 of the CAN module, when required, to the prescribed potential.

From the description of the error handling, it become clear that, to initiate the first emergency operation measure M1, the input terminal RX0 is applied via the switch S0 to the prescribed potential of, for example $V_{cc}/2$. If this emergency operation measure does not lead to the desired success, and errors continue to occur, the switch S0 is moved back into its original position illustrated in FIG. 16.

Then, in order to initiate the second emergency operation measure M2, the changeover contact S1 is activated and the input terminal RX1 of the CAN module is connected to the prescribable potential of, for example, $V_{cc}/2$.

The timing diagrams of the FIGS. 1 to 15 show, apart from a master, in each case two subscribers A and B. In the illustration according to FIG. 16, it is assumed that more than a total of three subscribers can also be connected to the data lines. Therefore, a subscriber Tln x is illustrated.

The subscribers A to x all have the same design. They are provided with a CAN module and a bus interface 9. Only the master is still connected to a terminating network.

However, it is possible also to provide at least one further subscriber with a terminating network, so that, in the event of an error of the master, said terminating network can assume its function. This was mentioned with reference to the description of FIG. 15.

Finally, it is to be noted that using the method described above functional errors of the databus and/or of individual subscribers of the computer network can be detected. Depending on the effect of the error, a suitable reaction to errors, an error handling, can be initiated. As a result, corresponding emergency operation measures which permit a further functioning of the network even after occurrence of the error can be taken.

It is conceivable that the different errors which can be differentiated with reference to the error detection signals are displayed.

By virtue of the fact that the master M illustrated in FIG. 16 carries out a level monitoring, steady-state global or dynamic global as well as steady state local level errors can be differentiated. In this case, the level on the bus is delayed in the steady state or in the dynamic state. In the case of the last mentioned level error, the level at the comparator inputs RX0 and RX1 at the affected CAN module is delayed. With level errors of this kind, the system continues to remain operative. However, the master is capable of indicating errors of this kind.

We claim:

1. In a computer network having a plurality of subscribers, each having a transmitting/receiving component and an error detection device, and
   a single databus, comprising at least two lines (U+, U−), interconnecting said subscribers,
   a method of monitoring the functioning of the databus and of the subscribers,
   comprising the steps of:
   periodically transmitting, from any arbitrary one (M) of said subscribers to the other ones (A,B) of said subscribers, an external error recognition signal $(S_{wd})$,
   independently monitoring, in the error detection device in each of said other subscribers (A,B), the databus for any dropout of said external error recognition signal, and,
   upon detection within said other subscriber (A,B) of such dropout, generating, within said other subscriber, an internal error recognition signal (CEI), thereby triggering emergency operation measures in the subscriber and actuating defined emergency modes of operation.

2. Method according to claim 1,
characterized in that
given error-free operation of all other subscribers, at least one external error recognition signal generated by said arbitrary subscriber is received within a predetermined time window.

3. Method according to claim 1,
characterized in that,
a steady-state, global error which affects all the subscribers and in the event of which the lines (U−, U+) of the databus continuously assume their activated state (dominant level), is recognized during a data transmission, and
as a result, at each subscriber, a subscriber-internal error detection signal (CAN-error-interrupt, CEI) is transmitted.

4. Method according to claim 1,
characterized in that,
in the event of a steady-state error of the receiving component of a subscriber (M, TlnA, TlnX), its error detection device is activated until an internal error detection signal (CAN-error-interrupt, CEI) is transmitted.

5. Method according to claim 1,
characterized in that,
in the event of an error of the transmitting part of a subscriber (M, TlnA, TlnX), the external error recognition signal (watch-dog-message, $S_{WD}$) of said arbitrary subscriber is suppressed and thus the emergency measures (M1, M2) are initiated.

6. Method according to claim 1,
characterized in that
in the event of an error already present in the quiescent state of the computer network, the subscribers synchronously initiate the emergency operation measures (M1, M2).

7. Method according to claim 1,
characterized in that,
in the event of a steady-state, global error which affects all the subscribers and in the event of which the lines (U−, U+) of the databus continuously assume their activated state (dominant level), at each subscriber, a subscriber-internal error detection signal (CAN-error-interrupt, CEI) is transmitted.

8. Method according to claim 7,
characterized in that
a frequency error, which transmits the error signal in the event of a predetermined error state, is used as error detection device.

9. Method according to claim 8,
characterized in that an error counter is reset and thus placed in its initial state, while the subscriber is reset and subsequently newly started.

10. Method according to claim 7,
characterized in that
at each internal error detection signal (CAN-error-interrupt, CEI), the error detection device is placed in its initial state.

11. Method according to claim 1,
characterized in that,
upon occurence of the internal error recognition signal (CAN-error-interrupt, CEI), initially a first emergency measure (M1), for setting a first emergency mode of operation (single-wire emergency mode), is initiated.

12. Method according to claim 11,
characterized in that
in the event of error-free operation of the network, after setting of the first emergency operation mode (single-wire emergency mode), this operation mode is maintained.

13. Method according to claim 11,
characterized in that
in the event of a local error affecting individual subscribers, as first emergency operation measure (MI), the input terminal (RX0) of the affected subscriber associated with the second line (U+) of the databus, is placed at a predetermined potential.

14. Method according to claim 11,
characterized in that,
on the occurrence of further error signals (watch-dog signals; CEI) after setting the first emergency operation mode (single-wire emergency mode),
the first emergency operation measure (MI) is cancelled and, for setting of the second emergency operation mode (special emergency mode), the second emergency operation measure (M2) is initiated.

15. Method according to claim 14,
characterized in that,
on the occurrence of a further external or internal error detection signal (watch-dog signal; CEI) after setting the second emergency operation mode (special emergency mode), at least the defective subscriber is switched off (bus-off);
and
in the event of an error of a master, and in the event of a global error affecting all the subscribers, all the subscribers are switched off (bus-off).

16. Method according to claim 15,
characterized in that,
after switching off (bus-off) of a single subscriber, the second emergency operation measure (M2) is cancelled.

17. Method according to claim 15,
characterized in that
upon switching off (bus-off) of the subscriber (master) which is transmitting the external error detection signal (watchdog signal), the error monitoring is switched off.

18. Method according to claim 14,
characterized in that,
in the event of error-free operation after setting the second emergency operation mode (special emergency mode), this operation mode is maintained.

19. Method according to claim 14,
characterized in that
in the event of a global error affecting all the subscribers and/or in the event of an error of a master, as first emergency operation measure (MI), the input terminals (RX0) of all subscribers, assigned to the second line (U+) of the databus, are placed at a predetermined potential and all the subscribers which were reset by an internal error detection signal (CEI) are restarted.

20. Method according to claim 14,
characterized in that
in the event of a local error affecting individual subscribers, as second emergency operation measure (M2), the input terminal (RXI), assigned to the second line (U−) of the databus of the affected subscriber is placed at a predetermined potential, and the output terminal (TXI) assigned to the second line (U−) of the subscriber, is switched in such a way that no information can be transmitted on this line.

21. Method according to claim 14,
characterized in that
in the event of a local error of the subscriber (master) which transmits the external error detection signal (watch-dog signal) and/or in the event of global errors which affect all the subscribers, as second emergency operation measure (M2), the second line (U−) is switched off by the master, and the input terminals (RXI), of all the subscribers, associated with the second line (U−) of the databus, are placed at a predetermined potential, and the output terminals (TXI), of all the subscribers, associated with the second line (U−), are switched in such a way that no information can be transmitted on this line.

22. In a computer network having a plurality of subscribers, each having a transmitting/receiving component and an error detection device, and a single databus having two lines interconnecting said subscribers and operating in a two-line communication mode, a method of monitoring the network in terms of operation of the databus and of the subscribers to maintain communication over the databus despite the occurrence of a network communication error, comprising the steps of:

periodically transmitting, from a selected one of said plurality of subscribers to the other subscribers, an external error recognition signal;

independently monitoring the databus, with the error detection device in each of said other subscribers, for any dropout of said external error recognition signal;

upon detecting said dropout with any one of said other subscribers, this being indicative of a network error, generating within said one other subscriber an internal error recognition signal; and responding to occurrence of said internal error recognition signal by changing over the databus operation from the two-line communication mode to a single-line communication mode.

23. The method of claim 22, wherein said responding step to change over the databus operation to a single-line communication mode includes deactivating communication along one of the two databus lines, and then further monitoring the network for any communication error.

24. The method of claim 23, wherein if a network error is detected by said further monitoring step, changing over the databus operation from a single-line communication mode along said one line to a single-line communication mode along the other line.

25. The method of claim 24, wherein said step of changing the single-line communication mode from one of the two databus lines to the other is followed by monitoring the network for any communication error and, if a network error is detected, switching off said one other subscriber.

* * * * *